United States Patent
Sreedhar M et al.

(10) Patent No.: US 10,565,108 B2
(45) Date of Patent: Feb. 18, 2020

(54) WRITE-BACK CACHE FOR STORAGE CONTROLLER USING PERSISTENT SYSTEM MEMORY

(71) Applicant: Dell Products L.P., Round Rock, TX (US)

(72) Inventors: Deepu Syam Sreedhar M, Calicut (IN); Stuart A. Berke, Austin, TX (US); Sandeep Agarwal, Bangalore (IN); Amit Pratap Singh, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 128 days.

(21) Appl. No.: 15/602,104

(22) Filed: May 23, 2017

(65) Prior Publication Data
US 2018/0341585 A1   Nov. 29, 2018

(51) Int. Cl.
*G06F 12/00*  (2006.01)
*G06F 12/0804* (2016.01)
*G06F 12/0868* (2016.01)

(52) U.S. Cl.
CPC ...... *G06F 12/0804* (2013.01); *G06F 12/0868* (2013.01); *G06F 2212/262* (2013.01); *G06F 2212/281* (2013.01); *G06F 2212/502* (2013.01); *G06F 2212/6012* (2013.01)

(58) Field of Classification Search
None
See application file for complete search history.

(56) References Cited

U.S. PATENT DOCUMENTS

2018/0018101 A1* 1/2018 Benisty ................ G06F 3/0608

OTHER PUBLICATIONS

American National Standard, Information Technology—SCSI Block Commands—2 (SBC-2) revision 4 Working Draft, Jul. 28, 2001 (Year: 2001).*

* cited by examiner

*Primary Examiner* — Jason W Blust
(74) *Attorney, Agent, or Firm* — Fogarty LLP

(57) ABSTRACT

Systems and methods provide a storage controller with write-back caching capabilities that may be used during scenarios where the storage controller is required to provide write-through caching, and thus unable to utilize internal cache memory for write-back caching. The storage controller utilizes an allocation of persistent memory that is made available by the host IHS (Information Handling System), to which the storage controller is coupled. In scenarios where the storage controller is required to provide write-through caching, the storage controller may be configured to route received write data to the allocated host memory. In this manner, the data integrity provided by write-through operations is maintained, while also providing the host IHS with the speed of write-back operations. When ready to store the write data, the storage controller may request the flushing of write data from the allocated host memory.

14 Claims, 4 Drawing Sheets

WRITE-BACK CACHE FOR STORAGE CONTROLLER USING PERSISTENT SYSTEM MEMORY

FIELD

This disclosure relates generally to storage controllers utilized by Information Handling Systems (IHSs), and more specifically, to caching operations implemented by storage controllers.

BACKGROUND

As the value and use of information continues to increase, individuals and businesses seek additional ways to process and store information. An option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Certain IHSs may be configured to utilize an array of storage devices for storing information, such as in a Redundant Array of Independent Disks (RAID) system. In a RAID system, data is distributed across multiple storage devices of the array in such a manner that if one of the storage devices fails, the data stored on the failed storage device can be recovered from the remaining storage devices of the RAID system. Configured in this manner, the redundancy of RAID system increases fault tolerances and, in some scenarios, may also improve performance. An IHS configured for operation in a RAID system may utilize a storage controller component that controls the transfer of data to and from each of the individual RAID storage devices that are coupled to the IHS.

A storage controller typically includes an internal cache memory, typically a high-speed memory that may be comprised of multiple levels, that is used to buffer data as it is transferred to and from the RAID storage devices. When data is being written to the RAID system by the host IHS, the storage controller may cache the received write data in the internal cache memory. The storage controller may then transfer the cached write data to one or more of the RAID storage devices. A storage controller may be configurable to switch between two different modes of operation for this process of caching write data received from the host IHS. The mode of write data caching that is current being enforced by a storage controller may be referred to as the write policy of the storage controller.

In a write-through mode, the write data is cached by the storage controller and immediately transferred to storage locations disbursed in the RAID storage devices coupled to the storage controller. The storage controller does not acknowledge the completion of the write data operation to the host IHS until this entire write operation is complete. While write-through caching seeks to guarantee the integrity of each write data operation by the storage controller, the write-through process also results in significant latency in each write operation. In a write back mode, the storage controller acknowledges the completion of the write data operation upon caching the write data to the cache memory. The host IHS may resume operations upon receipt of this acknowledgement, thus improving the speed of write operations from the perspective of the host IHS. The write data may remain queued in cache memory while the storage controller processes other data transfers or perform other operations. For the host IHS, the latency of each write-back data transfer is significantly reduced when compared to the use of write-though caching.

Due to the faster write operations allowed by write-back caching, it is typically the preferred mode of operation for a storage controller. However, in various scenarios, the storage controller may be limited to utilizing only write-through caching. For instance, in certain RAID operations, the storage controller may be required to operate using write-through caching. For instance, during RLM (RAID Level Migration) or OCE (On-line Capacity Expansion) RAID operations, a storage controller is required to provide write-though caching. Certain storage controllers may have limited or no internal cache memory, thus limiting these storage controllers to write-through caching. Certain storage controllers may include internal backup power systems that may be used to store cached memory data to persistent memory in the case of a loss of power. In such storage controllers, write-back caching may only be enabled, in some scenarios, if the backup power system is charged and operable. A storage controller may be similarly limited to providing write-through caching in various additional scenarios.

SUMMARY

The described embodiments provide systems and methods for providing a storage controller with write-back caching capabilities even in scenarios where the storage controller is required to provide write-through caching. In various embodiments, a storage controller coupled to a host IHS (Information Handling System) and further coupled to an array of storage devices includes a bus protocol interface operable to receive write data for storage to the array of storage devices and further operable to send a confirmation of the storage of the write data by the storage controller and further operable to transfer write data to and from an allocation of memory on the host IHS; and a processor component operable for executing software instructions that upon execution cause the storage controller to store the received write data to the array of storage devices, and to generate the confirmation of the write data storage: wherein: in a first mode, the confirmation is generated upon the completed storage of the write data to the array of storage devices; and in a second mode, the confirmation is generated upon the storage of the write data to the allocation of memory on the host IHS.

In certain additional embodiments of the storage controller, in the second mode, the received write data is transferred to the allocation of memory on the host IHS. In certain additional embodiments of the storage controller, the execution of the software instructions furthers causes the storage controller to issue a request to the host IHS for the allocation of memory by the host IHS. In certain additional embodiments of the storage controller, the execution of the software instructions furthers causes the storage controller to issue a command to the host IHS for the transfer of write data stored in the allocation of memory on the host IHS. In certain additional embodiments of the storage controller, the execution of the software instructions furthers causes the storage controller to receive the write data transferred from the allocation of memory on the host IHS and to store the write data to the array of storage devices. In certain additional embodiments of the storage controller, the storage controller includes a cache memory, wherein in the first mode, the cache memory is used for write-through caching of the write data. In certain additional embodiments of the storage controller, in the second mode, the cache memory cannot be used for write-back caching of the write data.

In various embodiments, a system for storing data to an array of storage devices includes: a host IHS (Information Handling System) that includes a persistent memory and a memory controller configured to allocate a portion of the persistent memory; and a storage controller coupled to the host IHS and further coupled to the array of storage devices, where the storage controller includes a bus protocol interface operable to receive write data for storage to the array of storage devices and further operable to send a confirmation of the storage of the write data by the storage controller and further operable to transfer write data to and from an allocation of the host IHS persistent memory; and a processor component operable for executing software instructions that upon execution cause the storage controller to store the received write data to the array of storage devices, and to generate the confirmation of the write data storage: wherein: in a first mode, the confirmation is generated upon the completed storage of the write data to the array of storage devices; and in a second mode, the confirmation is generated upon the storage of the write data to the allocation of the host IHS persistent memory.

In certain additional embodiments of the system, in the second mode, the received write data is transferred to the allocation of the host IHS persistent memory. In certain additional embodiments of the system, the execution of the software instructions furthers causes the storage controller to issue a request to the host IHS for the allocation of persistent memory. In certain additional embodiments of the system, the execution of the software instructions furthers causes the storage controller to issue a command to the host IHS for the transfer of write data stored in the allocated host IHS persistent memory. In certain additional embodiments of the system, the execution of the software instructions furthers causes the storage controller to receive the write data transferred from the host IHS persistent memory and to store the write data to the array of storage devices. In certain additional embodiments of the system, the storage controller includes a cache memory, wherein in the first mode, the cache memory is used for write-through caching of the write data. In certain additional embodiments of the system, in the second mode, the cache memory of the storage controller cannot be used for write-back caching of the write data.

In various embodiments, a method for storing data to an array of storage devices coupled to a storage controller includes: sending a request to a host IHS coupled to the storage controller for an allocation of a memory provided by the host IHS; receiving write data for storage to the array of storage devices; in a first mode: storing the received write data to the array of storage devices; and sending a confirmation of the storage of the write data; in a second mode: storing the received write data to the host IHS memory allocation; and sending a confirmation of the storage of the write data.

In certain additional embodiments of the method, in the second mode, the received write data is transferred to the host IHS memory allocation. In certain additional embodiments, the method further includes issuing a command to the host IHS for the transfer of write data stored in the host IHS memory allocation. In certain additional embodiments, the method further includes receiving the write data transferred from the host IHS memory allocation, and storing the write data the array of storage devices. In certain additional embodiments of the method, the storage controller comprises a cache memory, and wherein in the first mode, the cache memory is used for write-through caching of the write data. In certain additional embodiments of the method, in the second mode, the cache memory cannot be used for write-back caching of the write data.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network storage device, a network router, a network video camera, a data recording device used to record physical measurements in a manufacturing environment, or any other suitable device and may vary in size, shape, performance, functionality, and price. The IHS may include memory, one or more processing resources, e.g., a central processing unit (CPU) or hardware or software control logic. Additional components or the IHS may include one or more storage devices, one or more communications ports for communicating with external devices as well as various input and output (I/O) devices, e.g., a keyboard, a mouse, and a video display. The IHS may also include one or more buses operable to transmit communication between the various hardware components.

Figure 1:
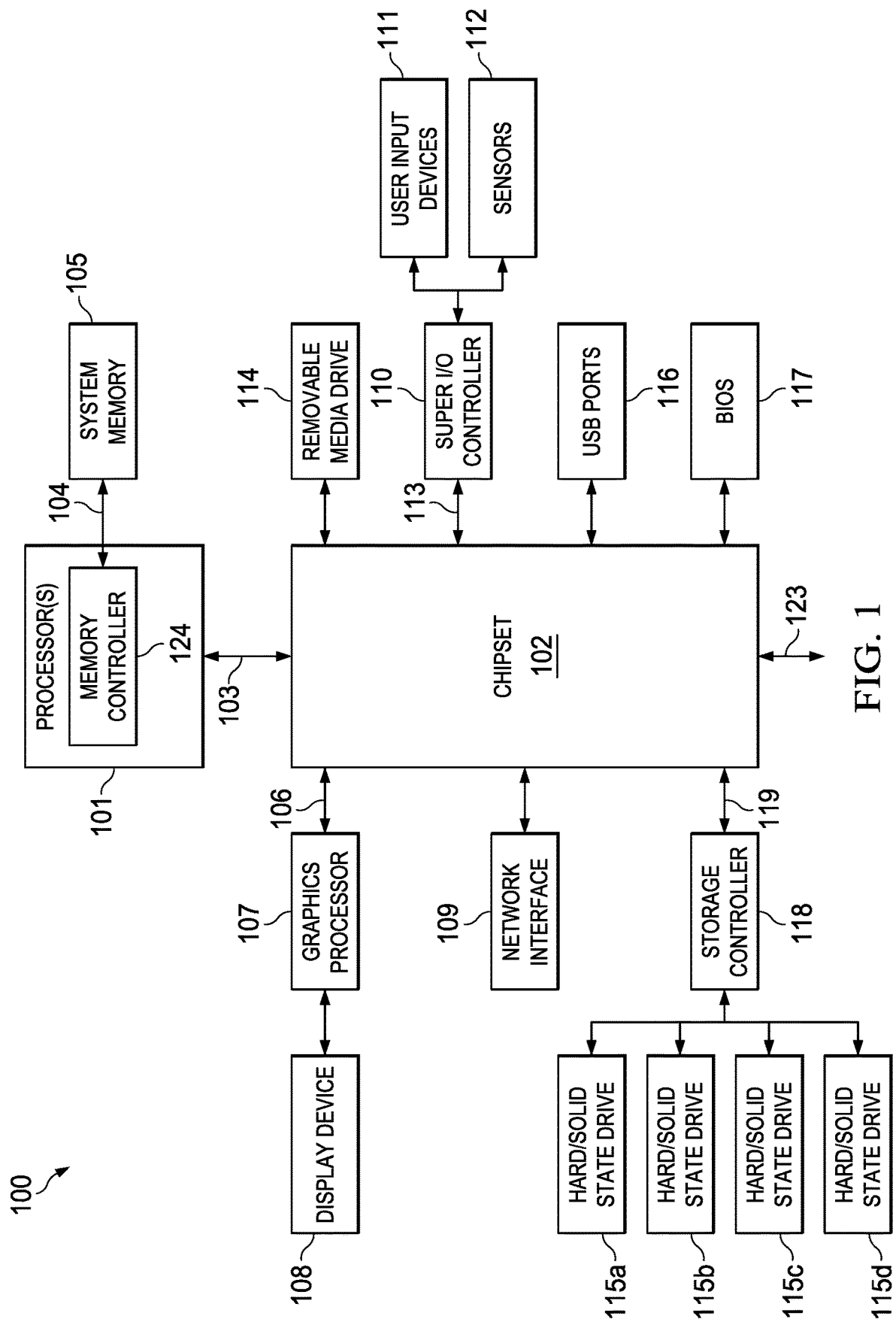
FIG. 1 is a block diagram depicting certain components of an IHS configured according to various embodiments.

An example of an IHS is described in more detail below. FIG. 1 shows an example of an IHS configured to implement the systems and methods described herein according to certain embodiments. It should be appreciated that although certain embodiments described herein may be discussed in the context of a server IHS, other embodiments may be utilized.

FIG. 1 is a block diagram of an IHS 100 configured according to certain embodiments in the implementation of a RAID system. IHS 100 may include one or more processors 101. In various embodiments, IHS 100 may be a single-processor system including one processor 101, or a multi-processor system including two or more processors 101. Processor(s) 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

System memory 105 may be configured to store program instructions and/or data accessible by processors(s) 101. In various embodiments, system memory 105 may be implemented using any suitable memory technology, such as static RAM (SRAM), dynamic RAM (DRAM), NAND Flash memory or other types of Flash memory. In certain embodiments, system memory 105 may combine both persistent, non-volatile memory and volatile memory. For instance, in certain embodiments, system memory may be a Non-Volatile Dual In-line Memory Module (NVDIMM) that includes a persistent memory, such as NAND flash, and a volatile memory, such as DRAM. NVDIMM utilizes its volatile memory for normal operations, but is configured to transfer the data from volatile memory to the persistent memory upon a loss of power, whether expected or unexpected. In certain embodiments, an NVDIMM utilizes a dedicated backup power source, such as a battery or charged capacitor, which provides the power necessary to transfer data to persistent memory upon an unexpected loss of power. Other embodiments may utilize similar memory technologies for system memory 105. For instance certain embodiments may utilize NVDIMM-N memory that is comprised of a volatile memory that is mirrored by a flash memory, as specified by JEDEC, which refers to the Joint Electron Device Engineering Council and the JEDEC Solid State Technology Association. In certain embodiments, system memory 105 may be an integrated directly within processor(s) 101, such as using NVDIMM-P memory technologies, as specified by JEDEC. In other embodiments, system memory 105 may be implemented using high-speed non-volatile memory technologies, such as INTEL 3D XPoint and other SCM (Storage Class Memory) technologies that provide non-volatile storage at speeds suitable for use in a system memory.

In the embodiment illustrated in FIG. 1, system memory 105 is accessed via a memory controller 124 that is an integrated component of one of the processor(s) 101 of the IHS 100. Memory controller 124 may be integrated directly within the circuitry of a processor 101, or the memory controller 124 may be a separate integrated circuit that is located on the same die as the processor 101. The memory controller 124 may include hardware and software that implements instructions for reading and writing data to the system memory 105. The memory controller 124 may also periodically refresh any system memory 105 components, such as DRAM memory elements, that must be periodically recharged in order to preserve data stored in the system memory 105. In certain embodiments, the memory controller 124 may be a separate component from the processor(s) 101. The memory controller 124 may be coupled to the system memory 105 via a high speed memory interface 104, such as a DDR4 (Double Data Rate fourth-generation) channel. Certain embodiments may utilize additional memory controllers that may similarly manage the transfer of data to and from system memory 105 on behalf of one or more of the processors 101. In certain of such embodiments, each of the multiple memory controllers may be utilized to support separate memory channels, such as a DDR4 channels, between the processor 101 and the system memory 105. In certain embodiments, the memory controller 124 may utilize other memory interfaces, such as the older DDR3 standard or DDR5, the eventual replacement to DDR4, for interfacing with system memory 105.

IHS 100 includes a chipset 102 that may include one or more integrated circuits that are connect to processor(s) 101 and that mange the transfer of data between the processor(s) 101 and the peripheral components of IHS 100, such as those illustrated in FIG. 1. In certain embodiments, the chipset 102 may utilize a QPI (QuickPath Interconnect) bus 103 for communicating with the processor(s) 101. In the embodiment of FIG. 1, chipset 102 is depicted as a separate component from processor 101. In other embodiments, all of chipset 102, or portions of chipset 102 may be implemented directly within the integrated circuitry of the processor 101. Chipset 102 provides the processor(s) 101 with access to a variety of resources provided by peripheral devices coupled to IHS 100.

For instance, chipset 102 may provide access to a graphics processor 107. In certain embodiments, graphics processor 107 may be comprised within one or more video or graphics cards that have been installed as components of the IHS 100. Graphics processor 107 may be coupled to the chipset 102 via a graphics bus 106 such as provided by an AGP (Accelerated Graphics Port) bus, a PCIe (Peripheral Component Interconnect Express) bus. In certain embodiments, graphics processor 107 generates display signals and provides them to a display device 108 that may be coupled directly to the IHS 100 or may be located remoted from the IHS 100.

In certain embodiments, chipset 102 may also provide access to one or more user input devices 111. In such embodiments, chipset 102 may be coupled to a super I/O controller 110 that provides interfaces for variety of user input devices 111, in particular lower bandwidth and low data rate devices. For instance, super I/O controller 110 may provide access to a keyboard and mouse or other peripheral input devices. In certain embodiments, super I/O controller 110 may be used to interface with coupled user input devices 111 such as keypads, biometric scanning devices, and voice or optical recognition devices. In certain embodiments, super I/O controller 110 may also provide an interface for communications with one or more sensor devices 112, which may include environment sensors, such as a temperature sensor or other cooling system sensors. The I/O devices, such as the user input devices 111 and the sensor devices 112, may interface super I/O controller 110 through wired or wireless connections. In certain embodiments, the super I/O controller 110 may be coupled to the super I/O controller 110 via a Low Pin Count (LPC) bus 113. In certain embodiments, the chipset 102 may also provide access to one or more Universal Serial Bus (USB) ports 116.

Another resource that may be accessed by processor(s) 101 via chipset 102 is a BIOS (Basic Input/Output System) 117. Upon booting of the IHS 100, processor(s) 101 may utilize BIOS 117 instructions to initialize and test hardware components coupled to the IHS 100 and to load an Operating System (OS) for use by the IHS 100. The BIOS 117 provides an abstraction layer that allows the operating system to interface with certain hardware components that are utilized by IHS 100. Via this hardware abstraction layer provided by BIOS 117, the software executed by the processor(s) 101 of IHS 100 is able to interface with certain I/O devices that are coupled to the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI. In certain embodiments, the BIOS may be replaced, in full or in part, by a baseboard management controller (BMC) or another in-band or out-of-band (OOB) controller.

Other resources may also be coupled to the processor(s) 101 of the IHS 100 through chipset 102. In certain embodiments, chipset 102 may be coupled to a network interface 109, such as provided by a Network Interface Controller (NIC) that is coupled to the IHS 100. In certain embodiments, the network interface 109 may be coupled to the chipset 102. According to various embodiments, network interface 109 may support communication via various wired and/or wireless networks. Chipset 102 may also provide access to one or more hard disk and/or solid state drives 115a-d via storage controller 118. In certain embodiments, the chipset 102 may also provide access to one or more removable-media drives 114, such as an optical drive. Any or all of the drive devices 114 and 115a-d may be integral to the IHS 100, or may be located remotely from the IHS 100.

In the embodiment of FIG. 1, IHS 100 provides data storage services by utilizing a storage controller 118 that provides access to four storage drives 115a-d. In certain embodiments, the storage controller 118 may be a RAID controller that is configured to provide access to storage drives 115a-d as components of a RAID system. In various embodiments, storage controller 118 may be comprised of hardware and software that is configured to provide storage and retrieval of data from the storage drives 115a-d. In certain of such embodiments, storage controller 118 may be a DELL PowerEdge Raid Controller (PERC) or other disk array controller. In certain embodiments, the storage controller 118 may be configured as a component of a system that provides access to the four storage drives 115a-d as a single storage device as part of a distributed data storage solution. In certain embodiments, an IHS may utilize additional storage controllers that provide access to additional storage devices.

In the illustrated embodiment, IHS 100 provides access to four storage drives 115a-d. In various embodiments, the four storage drives 115a-d may include SAS (Serial Attached SCSI) magnetic disk drives, SATA (Serial Advanced Technology Attachment) magnetic disk drives, solid-state drives (SSDs) and other types of storage drives in various combinations. In the embodiment of FIG. 1, the storage controller 118 supports four storage drives 115a-d. In other embodiments, the storage controller may support various different numbers of storage drives that may be more or less than the four storage drives of FIG. 1. Each of the storage drives 115a-d may be located within the enclosure of the IHS 100, such as within storage drive bays provided by the chassis of the IHS 100, or alternatively one or more of the storage drives 115a-d may instead be external to IHS 100. One or more of the storage drives 115a-d may instead be located remotely from IHS 100 and may be configured as network attached storage devices. Using these four storage drives 115a-d, IHS 100 may be configured as a server that provides various services as a part of a cloud implementation of multiple servers that may be distributed across multiple physical locations. In embodiments where the four storage drives 115a-d are components of a RAID system, IHS 100 may provide data storage services where data received from a client is distributed across the four storage drives 115a-d in a manner that creates redundancy of the received data and reduces the risk of information being lost due to the failure of any one of the individual storage drives 115a-d.

In order to interact with other components of the distributed storage system, such as a RAID system, storage controller 118 may be accessed via the chipset 102 using a PCIe bus 119. PCIe communication capabilities may be integrated within the storage controller 118. In various embodiments, IHS 100 is configured to utilize PCIe for transmitting communications with components in addition to storage controller 118. Using PCIe, IHS 100 may be connected to other PCIe compliant devices which provide IHS 100 with additional functionality. In certain embodiments, IHS 100 may also utilize a PCIe bus 123 for interfacing directly with neighboring IHSs in the formation of clusters of IHSs that may be used for various enterprise or scientific computing tasks.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
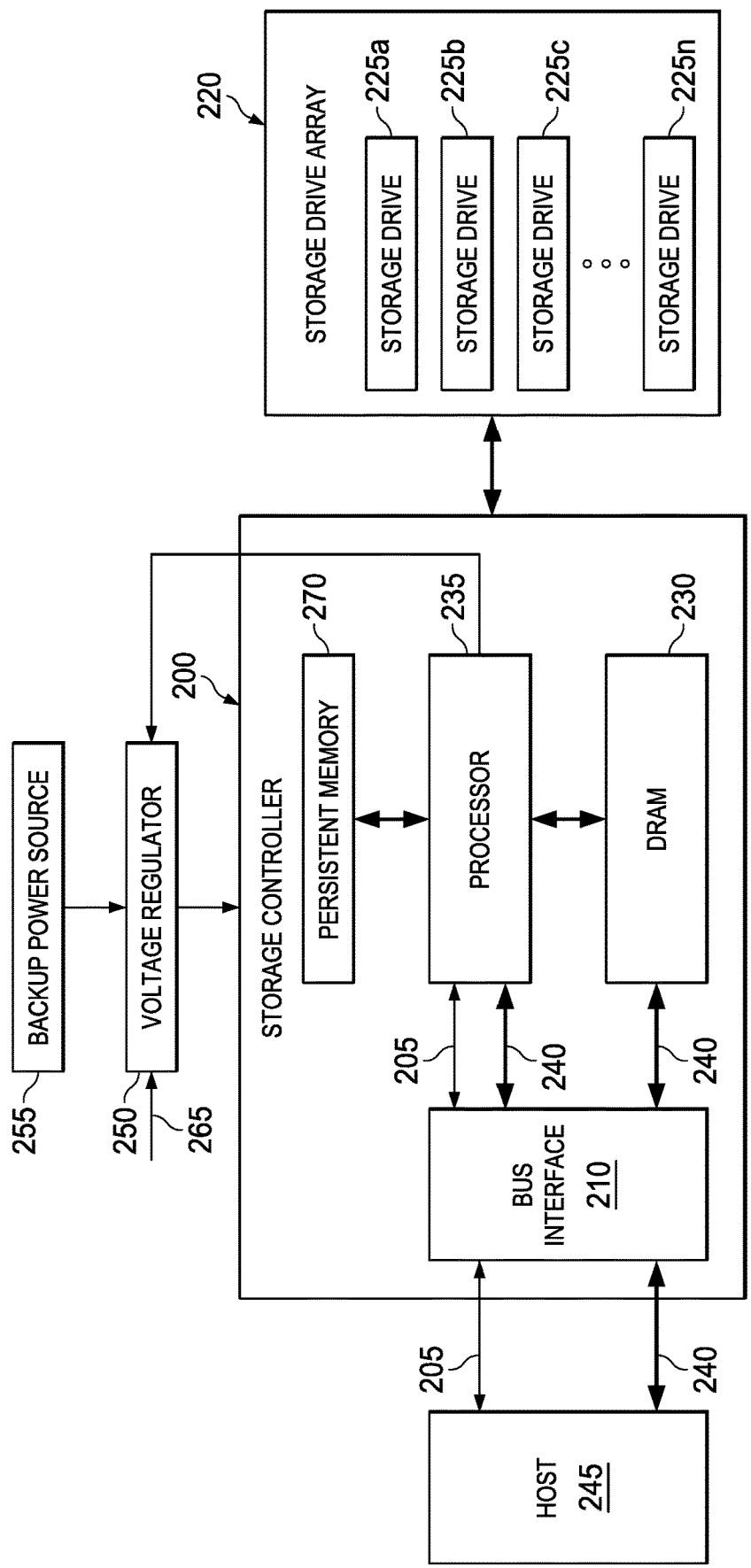
FIG. 2 is a block diagram depicting certain components of a storage controller configured according to various embodiments.

FIG. 2 is diagram illustrating certain components of a storage controller 200 connected to a host IHS 245 according to various embodiments. The storage controller 200 may be utilized to store data during the operation of an IHS, such as IHS 100 described with respect to FIG. 1. As described with respect to the storage controller 118 of FIG. 1, the storage controller 200 of FIG. 2 may be comprised of hardware and software components and may be configured to provide host IHS 200 with access to an array of storage drives 225a-n. In certain embodiments, the storage controller 200 may be a RAID controller that is configured to provide access to storage drives 225a-n as components of a RAID system that may include any number of similarly configured IHSs.

In the embodiment of FIG. 2, the storage controller 200 includes a processing component 235 such as a microprocessor, microcontroller, complex programmable logic device (CPLD), application-specific integrated circuit (ASIC), or field-programmable gate array (FPGA). The processor 235 of the storage controller 200 may be used to execute software code, in particular firmware, machine or other software code that implements the read and write operations supported by the storage controller 200. The read and write operations supported by the storage controller 200 may be used by the host IHS 245 to access the array of storage drives 225a-n. In particular, the software instructions utilized by the processor 235 in the operation of the storage controller 235 may be utilized to receive and process write data operations received from the host IHS 245.

In the embodiment of FIG. 2, host IHS 245 communicates with storage controller 200 via a bus interface 210 of the storage controller. In certain embodiments, the bus interface 210 may support multiple different interfaces. In the illustrated embodiment, bus interface 210 supports a low-bandwidth command interface 205, such as an I2C bus connection, and a high-speed interface 240, which may be used for high-speed transfers of write data to and from a memory allocated on the host 245. The command interface 205 may be used, as described with respect to the below embodiments, for certain communications between the storage controller 200 and the host IHS 245, such as out-of-band management of the storage controller. The high-speed interface 240 may be used by the host 245 for transfers of data, and for certain in-band configuration commands. For instance, the high speed interface 240 may be used to issue commands to the storage controller 200 for an allocation of persistent host memory storage that can be used by the storage controller to support write-back caching during periods where the storage controller 200 is required to provide write-through caching. The high speed interface 240 may be further used to issue commands signaling the host 245 IHS to flush the write data stored in the allocated host memory to the storage controller.

The storage controller 200 may include an internal volatile memory 230. In the embodiment of FIG. 1, internal memory 230 is DRAM (Dynamic Random-Access Memory). In other embodiments, internal memory 230 may be implemented using other memory technologies suitable for use as cache memory. Storage controller 200 may be configured to operate using either write-through or write-back caching. When configured for write-through caching, write data is received by storage controller 200 and cached to DRAM 230 while the write data is distributed to the storage drive array 225a-n according to the policies implemented by the storage controller. The storage controller 200 does not confirm the completion of the write operation until the completion of the storage of the write data to the storage drive array 225a-n. When configured for write-back operations, storage controller 200 caches received write data to DRAM 230 and proceeds to confirm the write operation.

In the illustrated embodiment, storage controller 200 utilizes a backup power source 255 that may be used to provide sufficient power for the storage controller to transfer the contents of DRAM 230, including any cached write data, to a persistent memory 270 in the event of an unexpected power loss or other malfunction. Persistent memory 270 may be any non-volatile memory, such as Flash memory, and may be used by the storage controller 200 in other aspects of its operations. In standard operations, storage controller 200 receives power from voltage regulator 250, which receives system power 265 from the host IHS 245. Backup power source 255 may be a capacitor, super capacitor, battery, or other suitable power supply or supplies configured to permanently or temporarily supply power to the storage controller 200 in the event of a power failure or interruption. In various embodiments, voltage regulator 250 and backup power source 255 may be integrated components of storage controller 200 or may be components provided by the host IHS 245.

Figure 3:
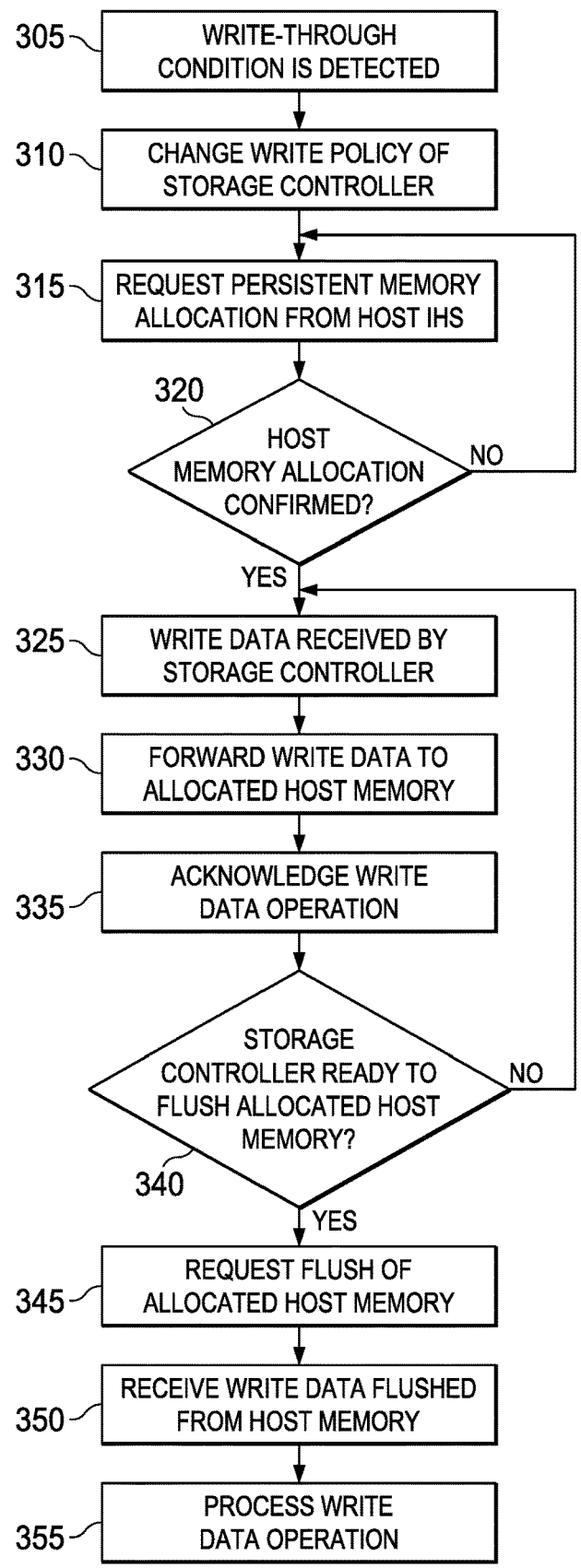
FIG. 3 is a flowchart illustrating certain steps of a process according to various embodiments for utilizing a host IHS memory cache for write-back caching in a storage controller such as illustrated in FIG. 2.

FIG. 3 depicts certain steps of a process according to various embodiments for utilizing a host IHS memory for write-back caching in a storage controller such as described with respect to FIG. 2. In the embodiment of FIG. 3, the process begins as step 305 with the detection of an event that requires the storage controller operate using write-through caching. As described, in certain scenarios, a storage controller operating within a RAID system may be required to operate using write-through caching. For instance, RAID controllers may be required to provide write-through operations during intervals where the RAID system is being reconfigured, such as via a RLM (RAID Level Migration) or OCE (On-line Capacity Expansion) RAID operation. During the pendency of such operations, the RAID system seeks to ensure data integrity by requiring write-through operations by the RAID controller. Once this transition period is over, the RAID system allows the RAID controller to resume operating using write-back caching.

Various additional scenarios may require that a storage controller provided write-through caching. As described, certain storage controllers may utilize various forms of backup power systems that may be used to safeguard the cached data in the event of sudden and unexpected power failures. Such storage controllers may be configured to support write-back caching only when the backup power system is charged and functioning properly, with the storage controller limited to providing write-through caching during all other instances. Certain storage controllers may include no internal memory cache, or a prohibitively small memory cache, thus limiting the storage controller to providing only write-through operations. At step 310, the storage controller may change its write policy in the event a condition requiring write-through operations is detected. The write policy may be used to signal the current mode of operation in storage controllers that are capable of operating utilizing either write-through or write-back caching. With the write policy of the storage controller set to write-through caching, the storage controller may be prohibited from utilizing internal cache memory, such as DRAM 230, for supporting write-back operations.

At step 315, the storage controller requests an allocation of persistent memory from the host IHS. In certain embodiments, the host IHS may support the allocation of persistent memory to requesting processes through the implementation of a Storage Class Memory (SCM) interface. In certain embodiments, the host IHS may support DMA (Direct Memory Transfers) transfers to and from the allocated persistent host memory. If the requested allocation of persistent memory is made by the host IHS, at step 320 the storage controller receives confirmation of the allocation. If the allocation cannot be made, at step 320 the storage controller is notified, at which point the storage controller may return to step 310 to issue another request, now seeking a smaller allocation of persistent memory.

If an allocation of persistent memory is made, at step 320, by the host IHS for use by the storage controller, the storage controller may begin utilizing the allocated host memory for supporting write-back operations. At step 325, the storage controller receives write data for transfer to the array of storage devices. At step 330, storage controller transfers the write data to the allocated host memory. In certain embodiments, data transfers to the allocated host memory may be made using a high-speed memory interface, such as DDR4. As described other embodiments may utilize other memory interfaces, such as DDR5, the planned successor to DDR4. Upon completing this transfer of the write data to the allocated host memory, at step 335, the storage controller confirms the write data operation. In this manner, the storage controller may continue to receive write data and to transfer the received write data to the allocated host memory. During such intervals of operation, the storage controller may provide the efficiency of write-back operations while still operating its own internal cache memory as a write-through cache.

At step 340, the storage controller is ready to flush the write data that has been transferred by the storage controller to the allocated host memory. As described, certain RAID configuration events require write-through operations by a storage controller in a RAID system. Once such operations are completed, a storage controller may resume use of internal cache memory for providing write-back caching. In other scenarios, the storage controller may request flushing of the write data in the allocated host memory based on the availability of storage controller resources. For instance, in certain embodiments, the storage controller may utilize idle intervals to process the write data requests that are stored in the allocated host memory. Storage controllers that include no internal cache memory for write-back caching may also use idle intervals for flushing write data from the allocated host memory.

If the storage controller is ready to flush the write data stored in an allocation of host memory, at step 345, the storage controller may issue a request for the transfer of the contents of a allocated host memory. In certain embodiments, the request is issued per a SCM interface supported by the host IHS for the management of allocated persistent memory. At step 350, the write data stored in the allocated host memory is transferred to the storage controller. In certain embodiments, the write data is transferred from the host memory via a high speed memory interface, such as DDR4. At step 355, the write data operation is processed by the storage controller. Per the storage procedures implemented by the storage controller, each write data operation is processed and the received data is distributed among the array of storage drives supported by the storage controller, in some scenarios according to RAID procedures implemented by the storage controller.

Figure 4:
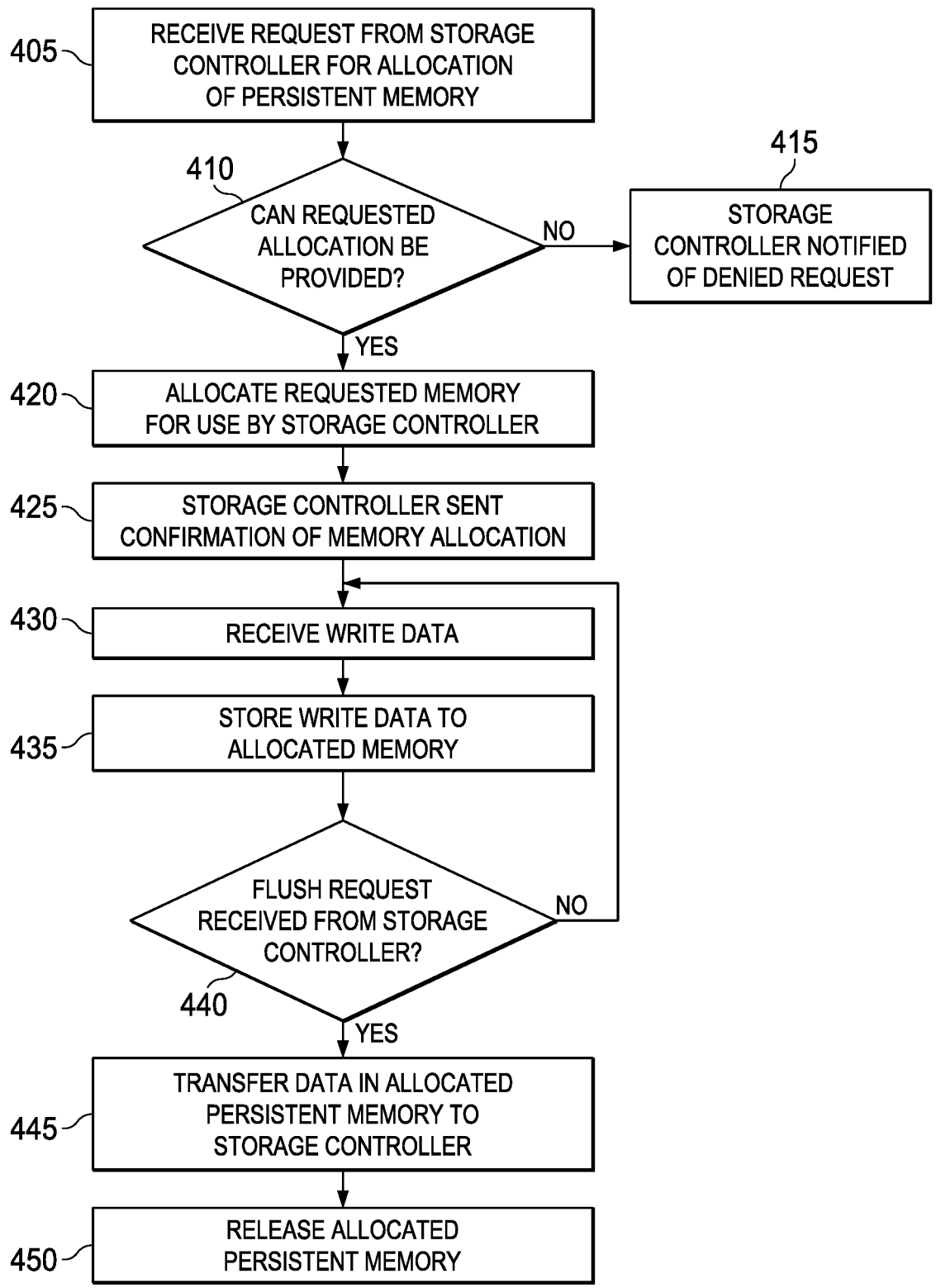
FIG. 4 is a flowchart illustrating certain steps of a process according to various embodiments for providing a storage controller a host memory cache for write-back caching by a host IHS such as illustrated in FIG. 1.

FIG. 4 illustrates certain steps of a process according to various embodiments for providing, by a host IHS such as described with respect to FIG. 1, a host memory to a storage controller for use in implementing write-back caching in scenarios where the storage controller is required to operate its internal cache using write-through caching. As described, a host IHS may include a memory controller that provides access to and manages a persistent memory that may be allocated in portions of various sizes to requesting processes. The illustrated embodiment begins at step 405 with the receipt by a host IHS memory controller of a request from a storage controller for an allocation of persistent memory. As described, a system memory of a host IHS may utilize a two-tier, high-speed memory that also provides persistence, such as NVDIMM or the described variants, which includes a high-speed memory suitable for caching and a backup power source that can be used to transfer the contents of the high-speed memory to a persistent memory in the event of a power loss. In certain embodiments, a memory controller of the host IHS processor may provide access to the persistent storage via a Storage Class Memory (SCM) interface that may support a high speed memory interface, such as DDR4. In certain scenarios, the request received from the storage controller may specify the size of the requested memory allocation. In other scenarios, the received request may instead be for a memory allocation of a default size.

At step 410, the memory controller of the host IHS determines whether the requested persistent memory can be allocated to the storage controller. The memory controller may make this determination based solely on the availability of persistent memory. In certain embodiments, the memory controller may determine availability based on additional factors, such as whether backup power is current available for the persistent memory or whether the host IHS has disabled the allocation of persistent memory. If no memory can be allocated in response to the request, at step 415, the memory controller notifies the storage controller that the request has been denied. In certain embodiments, the denial provided by the memory controller may include information indicating that the requested amount of memory is not available for allocation to the storage controller, but a smaller amount of memory may be available for allocation.

If the requested allocation of host memory can be allocated to the storage controller, at step 420 the memory controller reserves a portion of the host IHS persistent memory for use by the storage controller. In embodiments where the host IHS persistent memory is a two-tier memory, such as NVDIMM, that includes a volatile high-speed memory backed by a persistent memory, the allocation of memory may include allocating the requested amount of memory in both the high-speed volatile memory and the backing persistent memory, thus ensuring space is available to provide both high-speed access and sufficient persistent memory to preserve all received data in the case of a power loss. Once the memory controller has allocated the requested persistent memory, at step 425, the memory controller notifies the storage controller of the allocation.

With the requested host memory allocated to the storage controller, the storage controller may begin use of the allocated host memory to provide write-back caching as described with respect to the prior embodiments. At step 430, the memory controller receives write data from the storage controller for storage to the allocated host memory. As described, in certain embodiments, the memory controller of the host IHS may support high-speed transfers of such data via a memory interface such as DDR4. At step 435, the memory controller stores the received write data to a location in the persistent memory that has been allocated to the storage controller. Until, at step 440, a request is received from the storage controller to flush the write data stored in the allocated host memory, the memory controller continues to receive additional write data from the storage controller for transfer to the allocated host memory.

If at step 440, the memory controller receives a flush command from the storage controller, the memory controller proceeds to transfer the contents of the allocated host memory to the storage controller. At step 445, the memory controller transfers the write data stored in the allocated host memory. In certain embodiments, the memory controller may utilize a high-speed memory interface for the transfer of write data to the storage controller. In certain embodiments, each write data element in the allocated host memory is transferred to the storage controller as a separate operation of the high-speed memory interface. In such embodiments, the memory controller may be configured to transfer the individual write data operations to the storage controller in the same order the write data was received by the memory controller for storage to the allocated host memory. In certain other embodiments, the contents of the allocated host memory are transferred to the storage controller via a single memory operation of the high-speed memory interface. In such embodiments, the memory controller may order the write data within the memory operation based on the order the write data was received by the memory controller. Upon completion the transfer of write data to the storage controller, at step 450, the host memory allocated to the storage controller is released.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

For purposes of this disclosure, computer-readable media may include any instrumentality or aggregation of instrumentalities that may retain data and/or instructions for a period of time. Computer-readable media may include, without limitation, storage media, e.g., a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory. Computer-readable media may also include optically readable barcodes (one or two-dimensional), plastic cards with embedded magnetic stripes, mechanically or optically read punched cards, or radio frequency identification tags.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A storage controller coupled to a host IHS (Information Handling System) and further coupled to an array of storage devices, the storage controller comprising:
   a bus protocol interface operable to receive write data for storage to the array of storage devices and further operable to send a confirmation of the storage of the write data by the storage controller and further operable to transfer write data to and from an allocation of memory on the host IHS;
   a cache memory; and
   a processor component operable for executing software instructions that upon execution cause the storage controller to generate the confirmation of the storage of the write data, wherein:
      in a first mode, the write data is stored directly to the array of storage devices and the confirmation is generated by the storage controller upon the completed storage of the write data to the array of storage devices;
      in a second mode, the write data is stored to the cache memory and the confirmation is generated by the storage controller upon storage of the write data to the cache memory, wherein the write data is stored to the cache memory of the storage controller without use of the allocation of memory on the host IHS; and
      in a third mode that is enabled upon disabling of the second mode, the write data is stored to the allocation of memory on the host IHS and the confirmation is generated by the storage controller upon the storage of the write data to the allocation of memory on the host IHS, wherein the disabling of the second mode prohibits use of the cache memory of the storage controller.

2. The storage controller of claim 1, wherein, in the third mode, the received write data is transferred to the allocation of memory on the host IHS until the storage controller has sufficient available resources to allow transfer the write data to the array of storage devices.

3. The storage controller of claim 1, wherein the execution of the software instructions further causes the storage controller to issue a request to the host IHS for the allocation of memory by the host IHS.

4. The storage controller of claim 3, wherein the execution of the software instructions further causes the storage controller to issue a command to the host IHS for retrieval of write data stored in the allocation of memory on the host IHS.

5. The storage controller of claim 4, wherein the execution of the software instructions further causes the storage controller to receive the write data transferred from the allocation of memory on the host IHS and to store the write data to the array of storage devices.

6. A system for storing data to an array of storage devices, the system comprising
   a host IHS (Information Handling System) comprising:
      a persistent memory, and
      a memory controller configured to allocate a portion of the persistent memory;
   a storage controller coupled to the host IHS and further coupled to the array of storage devices, the storage controller comprising:
      a bus protocol interface operable to receive write data for storage to the array of storage devices and further operable to send a confirmation of the storage of the write data by the storage controller and further operable to transfer write data to and from an allocation of the host IHS persistent memory;
      a cache memory; and
      a processor component operable for executing software instructions that upon execution cause the storage controller to generate the confirmation of the storage of the write data wherein:

in a first mode, the write data is stored directly to the array of storage devices and the confirmation is generated by the storage controller upon the completed storage of the write data to the array of storage devices;

in a second mode, the write data is stored to the cache memory and the confirmation is generated by the storage controller upon storage of the write data to the cache memory, wherein the write data is stored to the cache memory of the storage controller without use of the allocation of memory on the host IHS; and in a third mode that is enabled upon disabling of the second mode, the write data is stored to the allocation of memory on the host IHS and the confirmation is generated by the storage controller upon the storage of the write data to the allocation of the host IHS persistent memory, wherein the disabling of the second mode prohibits use of the cache memory of the storage controller.

7. The system of claim 6, wherein, in the third mode, the received write data is transferred to the allocation of the host IHS persistent memory until the storage controller has sufficient available resources to allow transfer the write data to the array of storage devices.

8. The system of claim 6, wherein the execution of the software instructions further causes the storage controller to issue a request to the host IHS for the allocation of persistent memory.

9. The system of claim 8, wherein the execution of the software instructions further causes the storage controller to issue a command to the host IHS for retrieval of write data stored in the allocated host IHS persistent memory.

10. The system of claim 9, wherein the execution of the software instructions further causes the storage controller to receive the write data transferred from the host IHS persistent memory and to store the write data to the array of storage devices.

11. A method for storing data to an array of storage devices coupled to a storage controller, the method comprising:

sending a request to a host IHS coupled to the storage controller for an allocation of a memory provided by the host IHS;

receiving write data for storage to the array of storage devices;

in a first mode of operation by the storage controller:
storing the received write data to the array of storage devices; and
sending a confirmation of the storage of the write data upon the completed storage of the write data to the array of storage devices;

in a second mode of operation by the storage controller:
storing the received write data to the cache memory without use of the allocation of memory on the host IHS; and
sending a confirmation of the storage of the write data upon the storage of the write data to the cache memory; and in a third mode of operation by the storage controller that is enabled upon disabling of the second mode, wherein the disabling of the second mode prohibits use of the cache memory of the storage controller:
storing the received write data to the host IHS memory allocation; and
sending a confirmation of the storage of the write data upon the completed storage of the write data to the host IHS memory allocation.

12. The method of claim 11, wherein, in the third mode, the received write data is transferred to the host IHS memory allocation until the storage controller has sufficient available resources to allow transfer the write data to the array of storage devices.

13. The method of claim 12, further comprising:
issuing a command to the host IHS for the transfer of write data stored in the host IHS memory allocation.

14. The method of claim 13, further comprising:
receiving the write data transferred from the host IHS memory allocation, and
storing the write data to the array of storage devices.

* * * * *